United States Patent
Gloystein

(10) Patent No.: US 6,537,001 B1
(45) Date of Patent: Mar. 25, 2003

(54) HOLDING PIECE AND METHOD FOR HOLDING CONTAINERS

(75) Inventor: Jurgen Gloystein, Bremen (DE)

(73) Assignee: MacGregor-Conver GmbH (DE)

( * ) Notice: Subject to any disclaimer, the term of this patent is extended or adjusted under 35 U.S.C. 154(b) by 0 days.

(21) Appl. No.: 09/463,857

(22) PCT Filed: Aug. 8, 1998

(86) PCT No.: PCT/EP98/05038

§ 371 (c)(1),
(2), (4) Date: Apr. 14, 2000

(87) PCT Pub. No.: WO99/07623

PCT Pub. Date: Feb. 18, 1999

(30) Foreign Application Priority Data

Aug. 12, 1997 (DE) .......................................... 197 34 813

(51) Int. Cl.[7] .................................................. B60P 7/08
(52) U.S. Cl. ............................... 410/69; 410/70; 410/76
(58) Field of Search .............................. 410/69, 70, 76, 410/71, 80, 83; 24/287; 292/137, 163

(56) References Cited

U.S. PATENT DOCUMENTS

| 3,431,017 A | * | 3/1969 | Joseph | 410/80 |
| 3,508,501 A | * | 4/1970 | Nagy | 410/69 X |
| 3,604,363 A | * | 9/1971 | Smith | 410/70 |
| 3,827,375 A | * | 8/1974 | Terlecky et al. | 410/70 |
| 4,277,212 A | * | 7/1981 | Rosaia | 410/69 X |
| 4,776,736 A | * | 10/1988 | Tatina | 410/83 |
| 5,356,249 A | * | 10/1994 | Hove | 410/83 |
| 5,570,981 A | * | 11/1996 | Brewster | 410/70 |
| 5,575,599 A | * | 11/1996 | Conlea et al. | 410/69 |
| 5,613,814 A | * | 3/1997 | Jackson | 410/70 |
| 5,758,391 A | | 6/1998 | Donner | |
| 5,839,864 A | * | 11/1998 | Reynard | 410/69 |
| 5,842,821 A | * | 12/1998 | Coslovi et al. | 410/76 X |
| 6,039,519 A | * | 3/2000 | Jones et al. | 410/69 |

FOREIGN PATENT DOCUMENTS

| DE | 296 21 266 | 2/1997 |
| DE | 297 17 934 | 12/1997 |
| EP | 0 477 887 | 4/1992 |
| TW | 303331 | 4/1997 |
| WO | 92 05093 | 4/1992 |

OTHER PUBLICATIONS

Copy of Taiwan "Prenotice of Rejection".

* cited by examiner

Primary Examiner—Stephen T. Gordon
(74) Attorney, Agent, or Firm—Technoprop Colton LLC

(57) ABSTRACT

A stowage component (10) that enables release of containers coupled together both by manual actuation of the stowage component (10) and also by automatic uncoupling of the stowage component (10) from the relevant container, so as to allow uniform identical stowage components (10) to be used in general, and also used in the area of narrow joints between 20-foot containers, thus helping to eliminate confusion, such as is possible in the case of the previously necessary different stowage components (10).

21 Claims, 12 Drawing Sheets

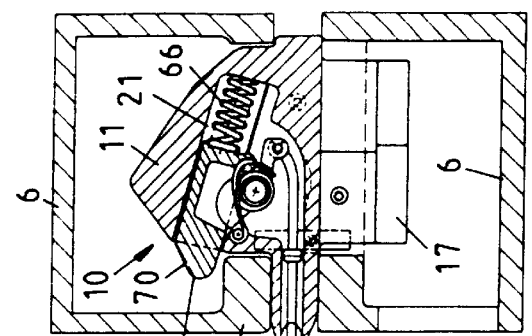
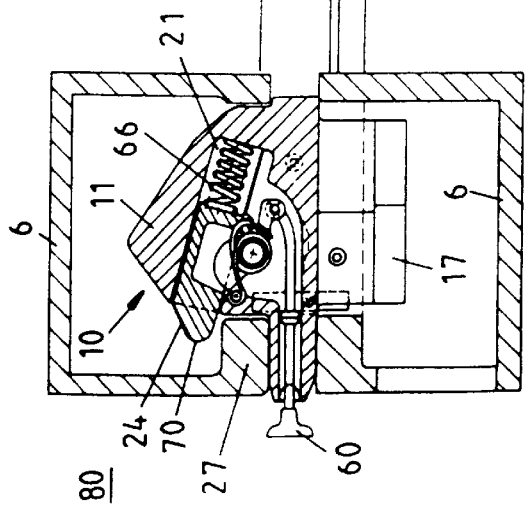
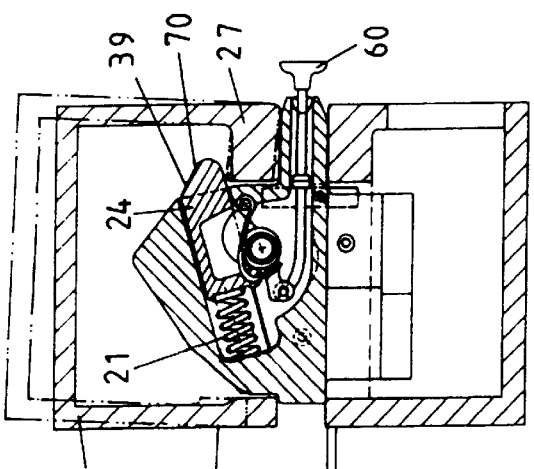
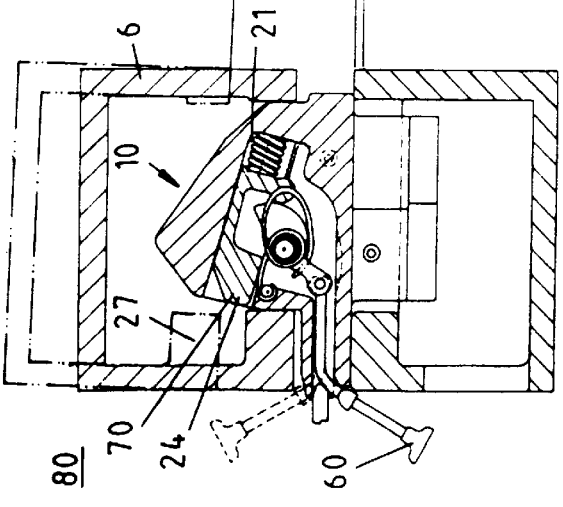
Fig. 16
Fig. 17

HOLDING PIECE AND METHOD FOR HOLDING CONTAINERS

BACKGROUND OF THE INVENTION

The invention relates to a stowage component. The invention also relates to a method of stowing, particularly connecting containers.

Conventionally, for transporting goods, containers are used which are fitted at their eight corners with so-called corner castings. These are constructively integrated in the other containers in such a way that the forces introduced via the corner castings are capable of holding the container at a provided site on a support, preferably consisting of containers underneath. Provided in the corner castings, which are formed similarly to the entire container as a rule according to International Standards (ISO), are openings, through which stowage components are introduced into a space enclosed by the corner casting, and can be locked therewith.

Stowage components of the type discussed here have been the subject of lively development activity in the course of time. Many different types of stowage components exist. Many of them are fitted with a pivot, which after its introduction into the inner space of a corner casting is rotated and thus securely connects the corner casting and thereby the entire container to a support, for example a ship's deck or at least one container located beneath the container to be secured. Such stowage components, termed twistlocks, have proved their worth in practice. However, they encounter difficulties at those points which are difficult to reach during loading and/or unloading of the containers. Principal among these are the so-called 20-foot ISO container joints. These difficulties rise due to the fact that two containers at 20 feet each must be deposited on a stand site provided for one 40-foot container. In this case there is between the two 20-foot containers a joint of 3 inches wide (76 mm). This joint is too narrow to permit human activation. For this reason, attempts have been made for a long time to provide a locking system for the containers in the area of this joint, which is independent of human activity.

For this purpose stowage components converted from other areas of use were used, these however being extremely difficult to use, as they may be easily confused and have a strength which lies only at the lowest acceptable threshold. A further substantial disadvantage is the geometry of these parts, dictated by their function. They must project higher above or below the container corners, than the locking devices lying opposite, for example twistlocks or so-called semi-automatic twistlocks (SAT). Only in this way is it ensured that the attachment parts present in the area of the ISO container standard joint are initially locked upon placing of the container, before the twistlocks can be locked. In the case of containers and/or ships which must be loaded in the longitudinal direction, if this sequence cannot be guaranteed, considerable problems frequently arise in opening the jammed stowage components.

BRIEF SUMMARY OF THE INVENTION

The object of the present invention is therefore to improve a stowage component of the type initially named in such a way that with its aid locking and/or unlocking of containers is generally simplified, and in particular in the area of the ISO 20-foot joint.

The object is achieved by a stowage component with the features described herein. By virtue of the fact that the connection between the guide piece of the stowage component and the aperture, particularly in the corner casting of the respective container, is optionally possible by means of a traction drive, for example a traction cable, or a relative movement of the container is possible relative to the guide area, in particular at least one container located underneath, with one and the same stowage component, and these above all can also be released, if only a small joint is present between adjacent containers, which does not permit manual activation of the traction drive and of the corresponding stowage components.

With the aid of such a stowage component a container may be automatically locked in the region of a support area, upon which the container is to be deposited. In this respect there are regarded as a support area in particular the floors of ships' holds, ship decks and the upper sides of other containers, upon which a container to be loaded is to be deposited. In addition, other support areas may be envisaged, for example stowage areas upon which containers are to be stowed on land.

The bolt is relatively easy to displace within its guide means, so that relatively small forces are sufficient in order to undertake this displacement. In addition, relatively small forces are sufficient in order to push the bolt out of its locked position back into its unlocked position. As a rule, spring forces are available for this purpose.

According to a preferred embodiment of the invention, the bolt is acted upon in a locked position by a force acting on its control end facing away from the locking end. In this case the bolt extends through a guide means extending through the entire guide piece, so that it can be acted upon at both ends in order to execute movements.

According to a further preferred embodiment of the invention, the control end in the locked position is acted upon by the container which is lowered onto the support area. By means of this control of the bolt it is possible to control the locking movement in dependence on the movement of the container to be locked.

A further stowage component for achieving the purpose already mentioned has the features described herein. By means of the bolt extending obliquely to the plane of the support area of containers, it is possible, by means of tilting the container into which the guide piece with the bolt projects, to disengage the rear side of the guide piece aligned away from the anchoring end of the bolt from the aperture in the container. In this way a relative displacement of the container to the guide piece can be induced, resulting in uncoupling the stowage component from the container. In this way the stowage component can be released or uncoupled from the container without the necessity manually to operate a traction drive of the stowage component. Furthermore, a situation is achieved by a stowage component with the feature described herein in which the guide means extend obliquely to a plane spanned by the support area. The bolt opens with above the plane with a spacing therefrom, which corresponds to the locking position provided in the aperture. In this way, the control end of the bolt is acted upon only when the container is lowered, when the locking end can be pushed into the locking position.

According to a further preferred embodiment of the invention, the bolt is acted upon by a spring force displacing it in the direction towards the unlocked position. In this way a situation is achieved in which, after removal of load from the control end, the spring force is placed in a position of pushing the bolt back into the unlocked position.

The four different embodiments of the bolt may all be basically envisaged. According to a preferred embodiment of the invention, the bolt is of a one-piece design. In this form it is pushed by the descending container by its control end as far into the guide means as it projects at its locking end out of the guide means. This embodiment is simple, and as a rule during operation gives rise to no problems.

According to another preferred embodiment of the invention the bolt consists of at least two parts located one behind the other in the longitudinal direction, which act upon one another when pushing movements take place within the guide means. In this embodiment of the invention, the rear part undertaking the locking is pressed by a compression spring into the locked position, when the container to be locked acts upon the control end in the direction of the guide means. In this way the rear part undertaking the locking is resiliently housed within the guide means, so that even during difficult loading activities, for example when there is a considerable wind pressure acting on the container, it can react resiliently to every eventuality.

According to a third preferred embodiment of the invention, the rear part facing the locking end is provided with a mechanism for locking and unlocking. Such a mechanism has the great advantage that manual unlocking can be undertaken should it not yet be intended to move the container to be unlocked. In this way a stowage component is provided which can be used in the area of the accessible end of a container instead of a twistlock for example. On the other hand this stowage component also permits fully automatic control with the aid of the control end, its movements being capable of being influenced by lowering and raising the container.

Finally, a considerable simplification of the bolt is achieved in that it only extends through a portion of the guide means facing the locking end out of which the bolt projects with its locking end. In the case the opposed end of the guide means is closed, so that a spring acting on the bolt can be supported thereon. The great advantage of this embodiment resides in the fact that a guide edge of the aperture in the corner casting of the container, when the latter is lowered, slides over a slide surface provided at the locking end of the bolt, and thus pushes the bolt into the guide means contrary to the force of the compression spring. This latter pushes the locking end into the locked position, as soon as the container has been fully lowered and the guide edge has passed the locking end. Now the bolt can only be displaced with the aid of a handle or a traction drive, particularly a traction cable or the like, which imparts to the stowage component the property of an SAT.

A cable forming the traction drive can be provided at the free end with a knob-like handle. The length of the portion of the cable projecting out of the stowage component when the stowage component is locked is such that, in a narrow joint between adjacent containers, the knob is housed to a sufficient extent, i.e. entirely or partly, in a lateral upright aperture, particularly in the corner casting of the container carrying the stowage component. In this way the knob-like handle is protected from damage in a narrow joint, and is prevented from counteracting coupling together of the containers.

A method for achieving the purpose has already been mentioned. According to this, in order to connect or couple together the containers or to couple them to a support area, identical stowage components are used. According to the invention, four identical stowage components are associated with the four corners of a container. By means of corresponding design of the stowage components it is possible to uncouple, i.e. release one container from containers lying underneath or from a support area, the locked condition of the stowage components on one side of the container which is freely accessible being released by actuating the handle of the cable or a similar traction drive. In this way the upper container can be tilted, so that it is releasable also from the two other stowage components without the necessity to open these in the area of a narrow inaccessible joint between adjacent containers by actuating the traction drive. In this way also a container may be uncoupled from containers lying underneath or from a support area even in inaccessible places.

Further details of the invention will become apparent from the following detailed description and the annexed drawings, which show preferred embodiments of the invention by way of example.

BRIEF DESCRIPTION OF THE DRAWINGS

FIG. 16: a pattern sketch of a longitudinal section through three container corners adjacent to one another, two of which belong to one container (type of stowage: upright), and FIG. 17: a pattern sketch of a longitudinal section through two container corners adjacent to one another, of a container during raising of the container (type of stowage: upright).

DETAILED DESCRIPTION OF THE PREFERRED EMBODIMENTS

Figure 1:
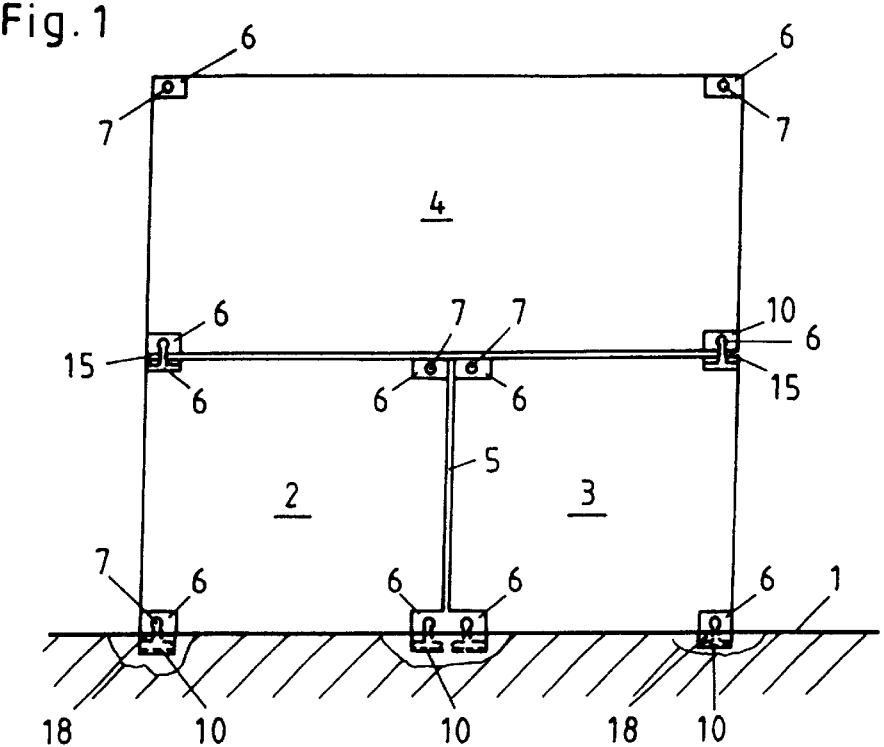
FIG. 1: a side view of two containers stacked on a support surface.
Figure 2:
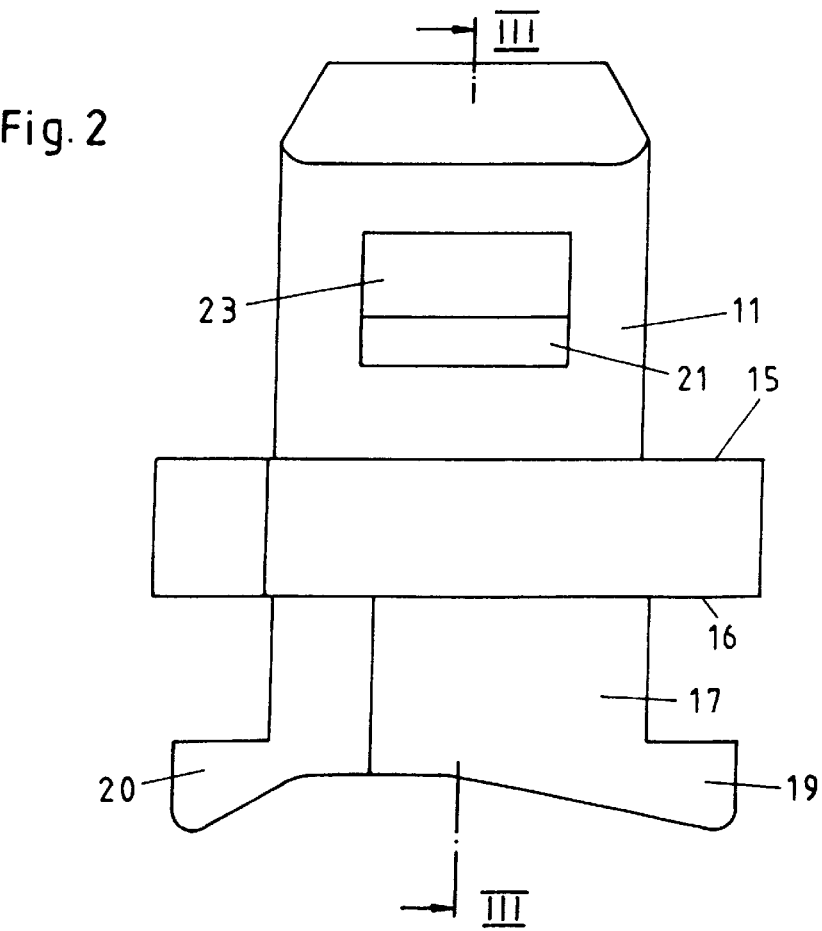
FIG. 2: a front view of a stowage component.
Figure 3:
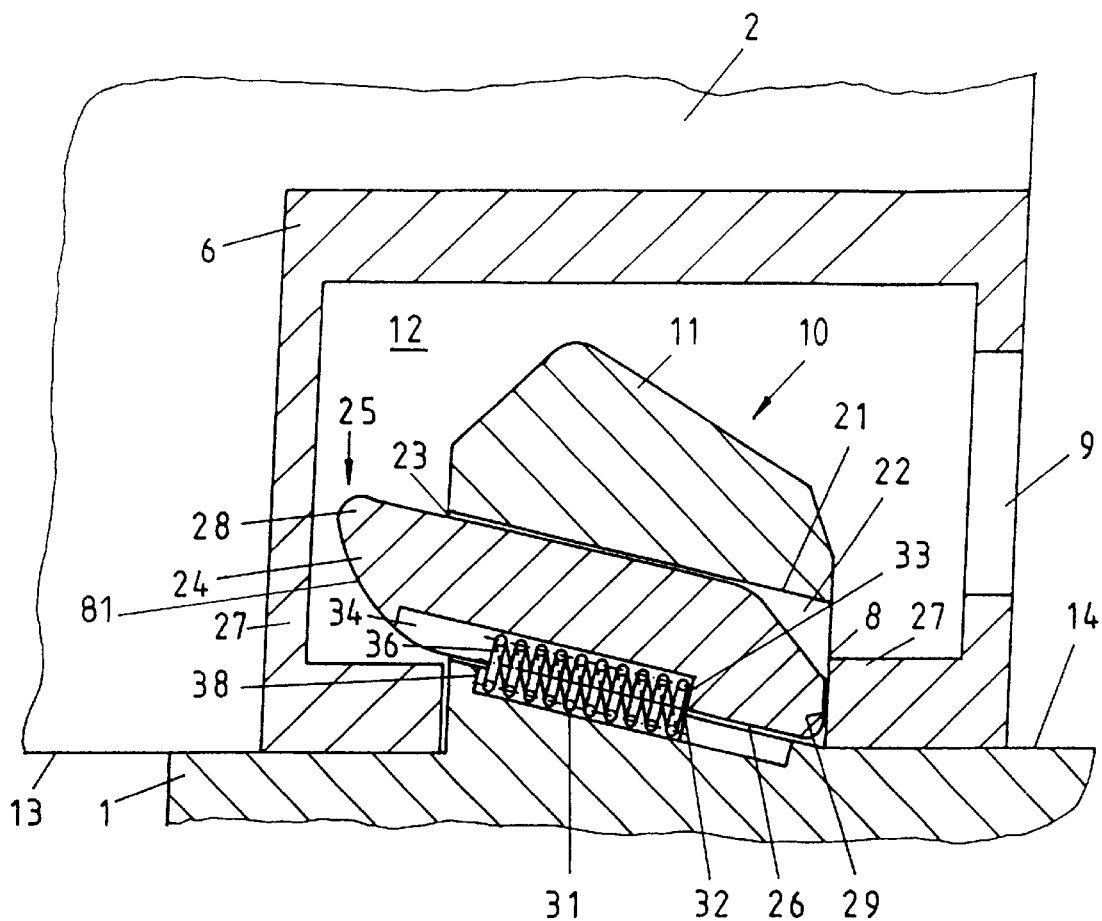
FIG. 3: a longitudinal section according to the section line III—III in FIG. 2 through a container corner and a stowage component projecting into it.
Figure 4:
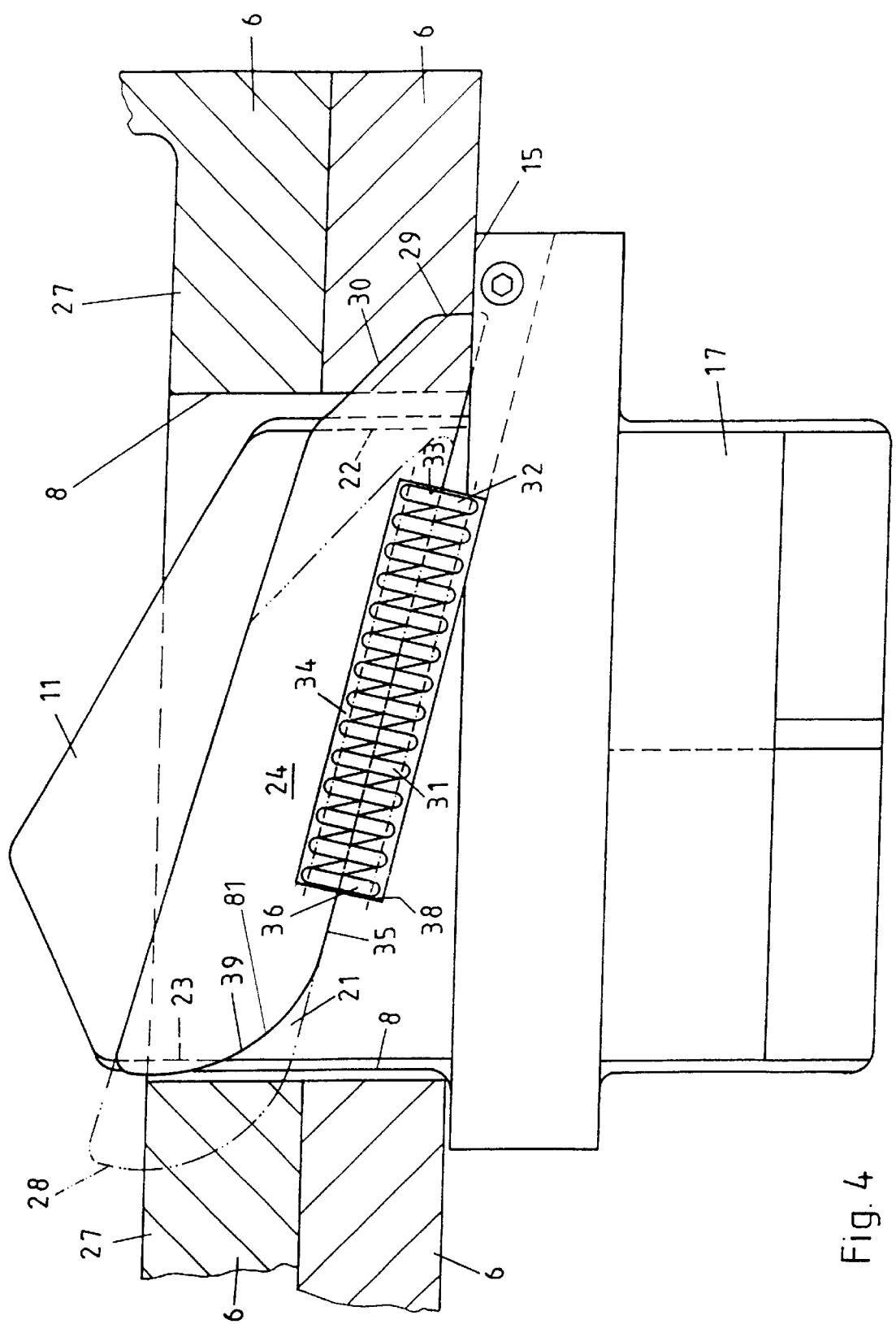
FIG. 4: an enlarged detail of the longitudinal section in FIG. 3, FIG. 5: a pattern sketch of a stowage component with a bolt consisting of two parts.
Figure 5:
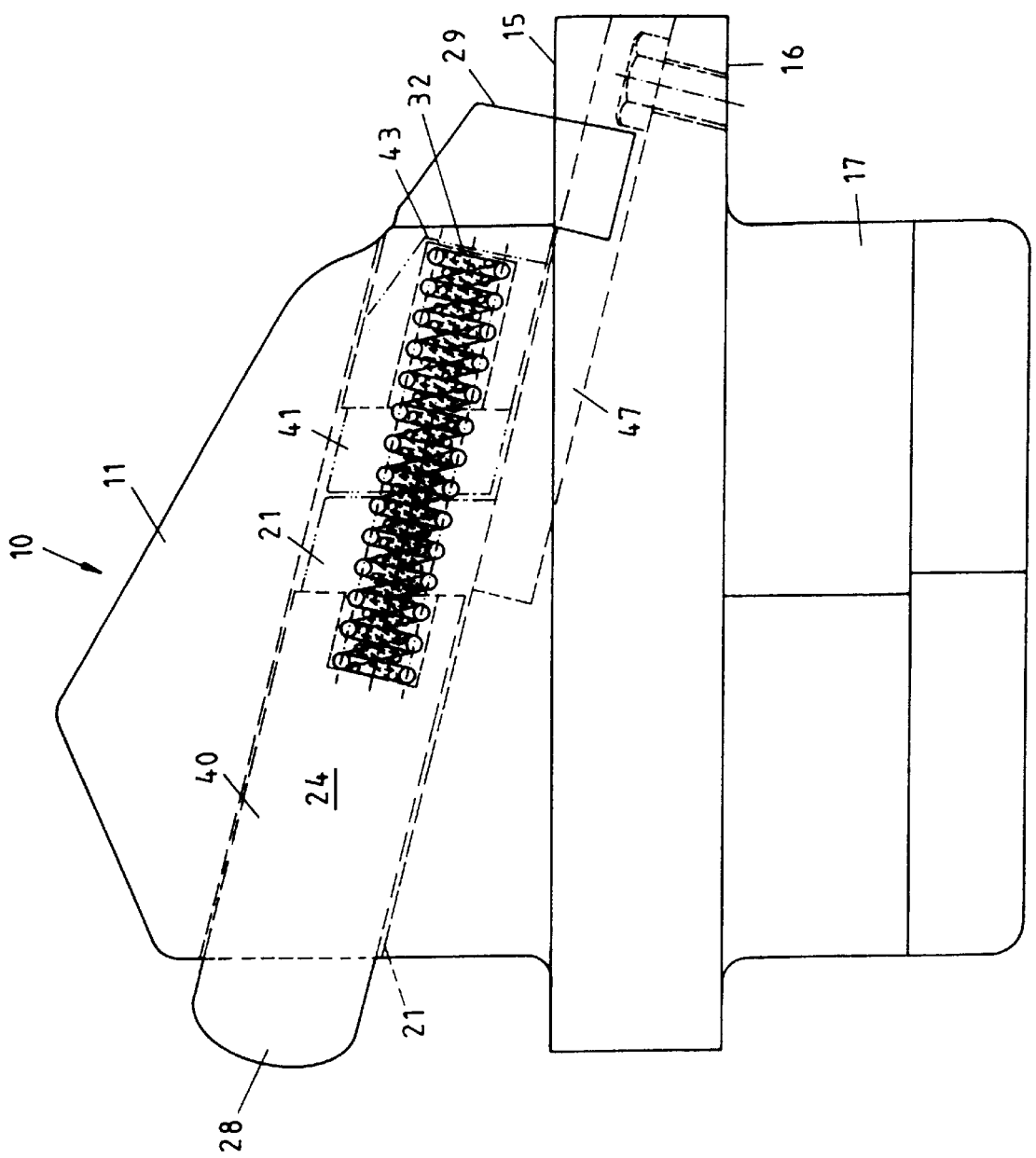
Figure 6:
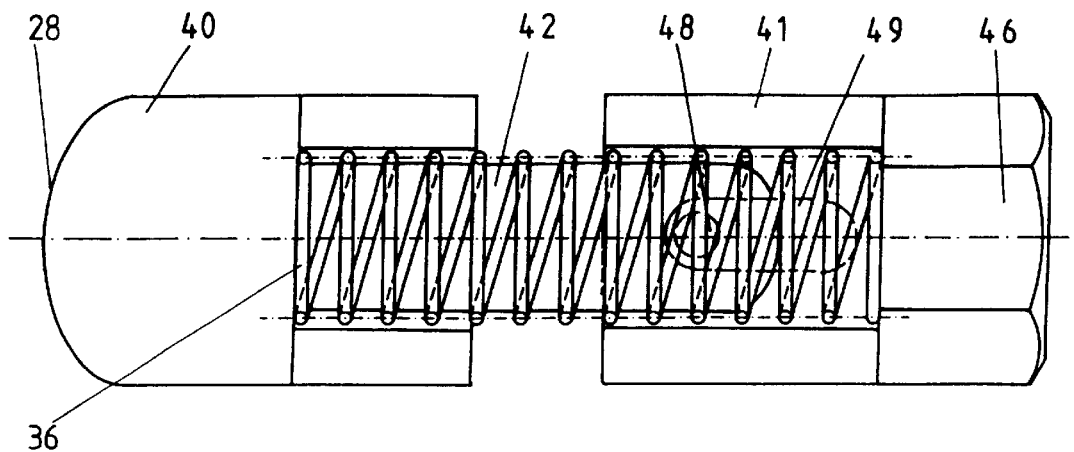
FIG. 6: a view from beneath of a bolt consisting of two parts.
Figure 7:
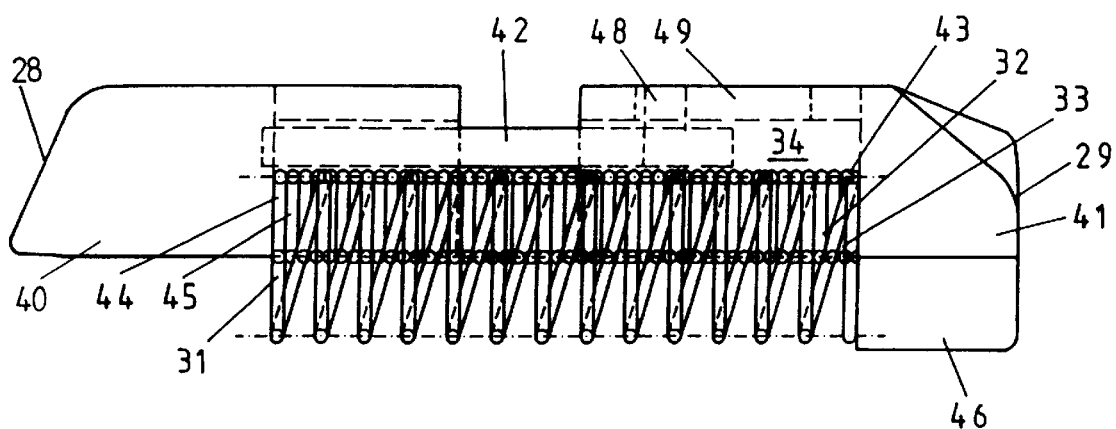
FIG. 7: a side view of a bolt consisting of two parts with inserted springs.
Figure 8:
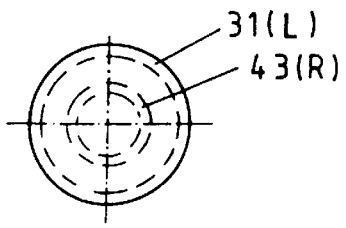
FIG. 8: a front view of two spiral springs one thrust into the other.

Three containers, 2,3,4 are stacked on a support area 1, for example a ship's deck. The lower containers 2,3 adjacent to the support area 1 are formed as 20-foot containers, while the upper container 4, as a 40-foot container, projects over the two lower containers 2,3. The length of the two lower containers 2,3 is shorter by a 20-foot ISO container joint 5 than the overall length of the 40-foot container 4. Each of the three containers 2,3,4 is provided at its corners with container corners 6, each container having eight of these. The container corners 6 are preferably standardised corner castings.

Provided in these container corners 6 are openings 7,8,9 which serve to secure the container 2,3,4 relative to a support area 1 or relative to other containers 2,3,4.

In order to connect together the containers 2,3,4 and to the support area 1 there are fastening devices. Each container corner 6 of each corner casting of a container 2,3 or 4 has associated therewith, for connection with the support area 1 or at least one of the containers located above or below the relevant container 2,3,4, four fastening devices. Associated with each container corner 6 on the upper side and/or underside of the relevant container 2,3,4 there is thus a fastening device. According to the invention identical fastening devices, i.e. stowage components 10, are used. These are semi-automatic automatic stowage components 10, so-called semi-automatic twistlocks (SAT).

A stowage component 10 projects with a guide piece 11 into an inner space 12 surrounded by the container corner. 6. The container corner 6 is guided on this guide piece 11 during placement of a container 2,3,4. In this way it is ensured that the container 2,3,4 stands precisely at a predetermined point, for example on the support area 1.

Thus the container 2,3,4 is supported with its lower surface 13 facing the support area 1 on a surface 14 facing it of the support area 1. As a rule the container 2,3,4 lies with its under surface 13 on a working surface 15, which surrounds the guide piece 11, which rises from the working surface 15. On an under-surface 16 facing away from the working surface 15, the stowage component 10 is supported on the support area 1. Connecting with the under-surface 16 there is a locking piece 17 in a direction facing away from the guide piece 11, and which can project into an aperture 18 provided in the support area 1 and which can be locked therein by locking cams 19,20 in a conventional way. In a similar way the stowage component 10 can be locked with its locking piece 17 also in container corners 6 of containers 2,3 lying underneath, if an upper container 4 is to be placed on these lower containers 2,3.

Extending through the guide piece 11 is a guide means 21, which extends obliquely with respect to a plane spanned by a support area 1. Thus the guide 21 opens with its lower mouth opening 22 facing the support area 1 into the area of the working surface 15, while its opposite upper or higher mouth opening 23 is located above the working surface 15 in such a way that a bolt 24 extending through the guide means 21 is in a locked position 25 locking the container corner 6 relative to the support area 1. In this locked position 25 the bolt 24 presses with its lower edge 26 facing the support area 1 onto a side surface 27 of the container corner 6 loading the support area 1.

The bolt 24 is designed as one piece and projects with a locking end 28 out of the upper mouth opening 23 into the inner space 12 of the container corner 6. Thus the bolt 24 is acted on at its control end 29 facing away from the locking end 28 by the side surface 27 of the container corner in the direction of the locking position 25, when the container 2 is lowered in the direction of the support area 1.

For this purpose the control end 29 is provided with a bevel 30, upon which the side surface 27 of the descending container 2 slides. Thus the weight of the container 2 presses the bolt 24 contrary to the pressure of a compression spring 31 into the guide means 21. In this case the compression spring 31 is supported with its first terminal end 32 on an end surface 33, which defines a housing 34 on its end facing the control end 29. This housing 34 is in a trough shape in a lower surface 35 of the bolt 24 facing the locking piece 17.

With its second end surface 36 facing away from the first end surface 32, the compression spring 31 is supported in the area of a lower portion 36 projecting out of the housing 34 on a second counter support 38 formed in the guide means 21, so that the bolt 24, when in the locked position, is tensioned by the compression spring 31. As soon as the container 2 is raised or tilted and the control end 29 is released from the side surface 27 and is thus freed of load, the compression spring 31 presses the bolt 24 back into its unlocked position, so that the locking end 28 is accommodated by the guide means 21. In this position of the bolt 24 the portion of the side surface 27 adjacent to the locking end 28 slides along a rounded forward edge 39 of the bolts 24, so that the container corner 6 can be raised from the guide piece 11.

Another embodiment of the stowage component 10 has a bolt 24 which consists of two parts 40,41 (FIGS. 5 to 8). These two parts 40,41 are located one after the other in the longitudinal direction of the guide means 21. They are interconnected by a connecting web 42, which extends through a housing 34 formed in the two parts 40,41.

Located in this housing 34 are two compression springs 31, of which a smaller compression spring 43 extends through the larger compression spring 31. In this case the two compression springs 31,43 wind in contrary directions, i.e. the larger compression spring 31 can be wound in a left-hand direction and the smaller compression spring 43 in a right-hand direction.

The larger of the two compression springs 31 projects out of the housing 34 and is supported with its first terminal surface 32 on an end surface 33 defining the housing 34 in the part 41. The lower end of the larger compression spring, projecting out of the housing 34, is supported on the counter surface formed in the guide means 21.

In contrast to this, the smaller compression spring 43 does not project downwards out of the housing 34. It is rather exclusively supported on the end surface 33 of the housing 34 formed in the part 41, while its forward end 44 lying opposite the end surface 33 is supported on an end surface 45 adjacent thereto, which is formed in the part 40.

The two parts 40,41 are secured in the guide means 21 against slipping out. They are guided with the aid of a guide surface 46 formed on part 41 in a correspondingly provided groove 47 which is formed in the guide means 21.

In addition, both parts 40,41 are interconnected by the connecting web 42, from which a guide pin 48 opens into a slot 49 and is guided therein in the longitudinal direction of the bolt 24. It is ensured in this way that upon removal of load from the rear part 41 from the ascending side surface 27 of the container corner 6, the rear part 41 is acted upon in the guide means 21 by the compression spring 31 and slides into an unlocked position, thus drawing the forward part 40 via the guide pin 48 into the unlocked position.

In the case of this construction consisting of two parts 40,41 of the bolts 24 it is ensured, upon loading of the control end 29 by the side surface 27 of the container corner 6, that the movement of the locking end 28 can adapt resiliently to the respective lowered position in which the side surface 27 is located. In this case firstly the rear part 41 is displaced along the slot 49 in the direction of the forward part 40. Only when the side surface 27 has released the locking end 28 of the forward part 40, does the smaller compression spring 43 press the forward part 40 into the locking position.

Figure 9:
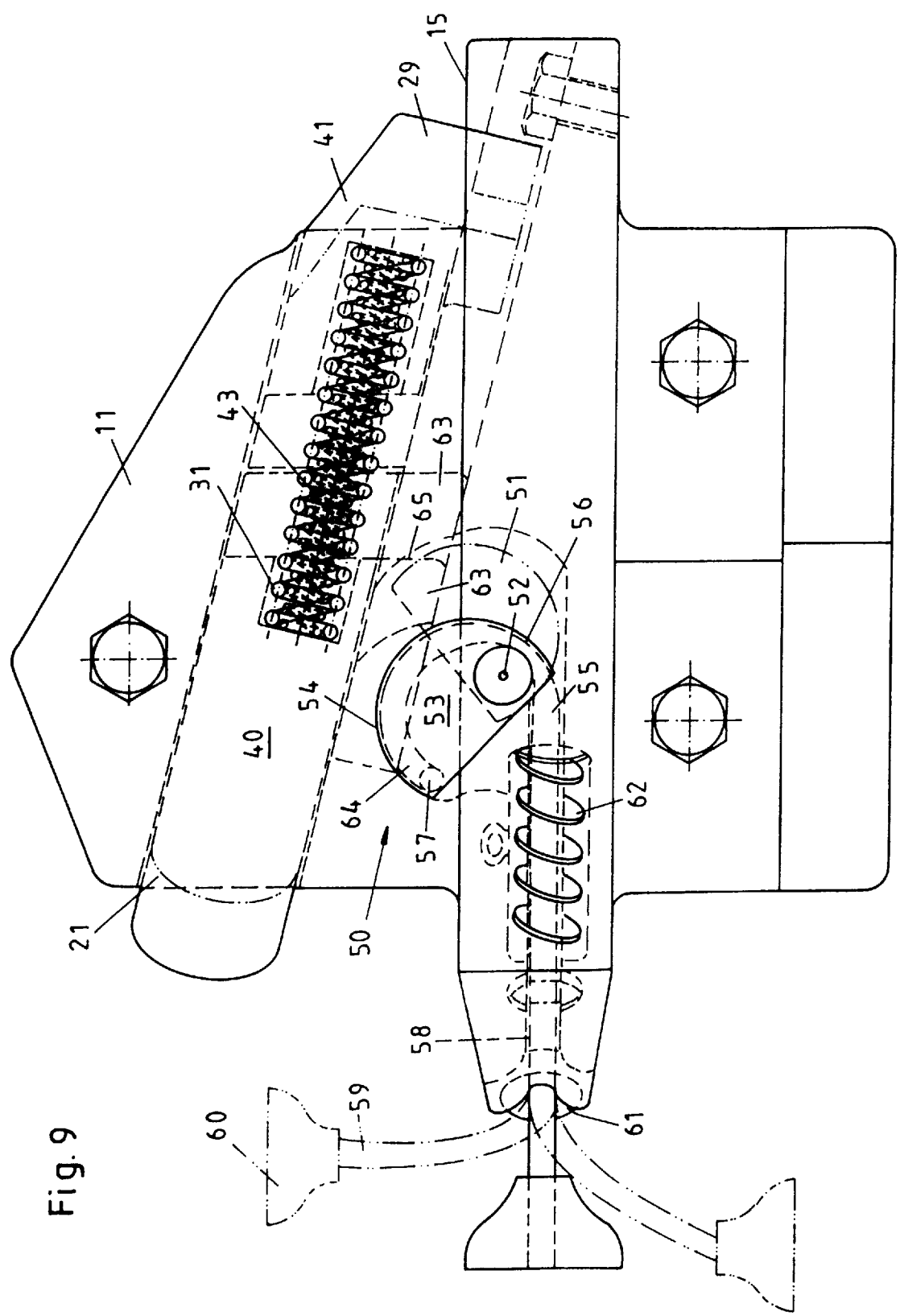
FIG. 9: a pattern sketch of a stowage component with a two-part bolt and a locking mechanism.
Figure 10:
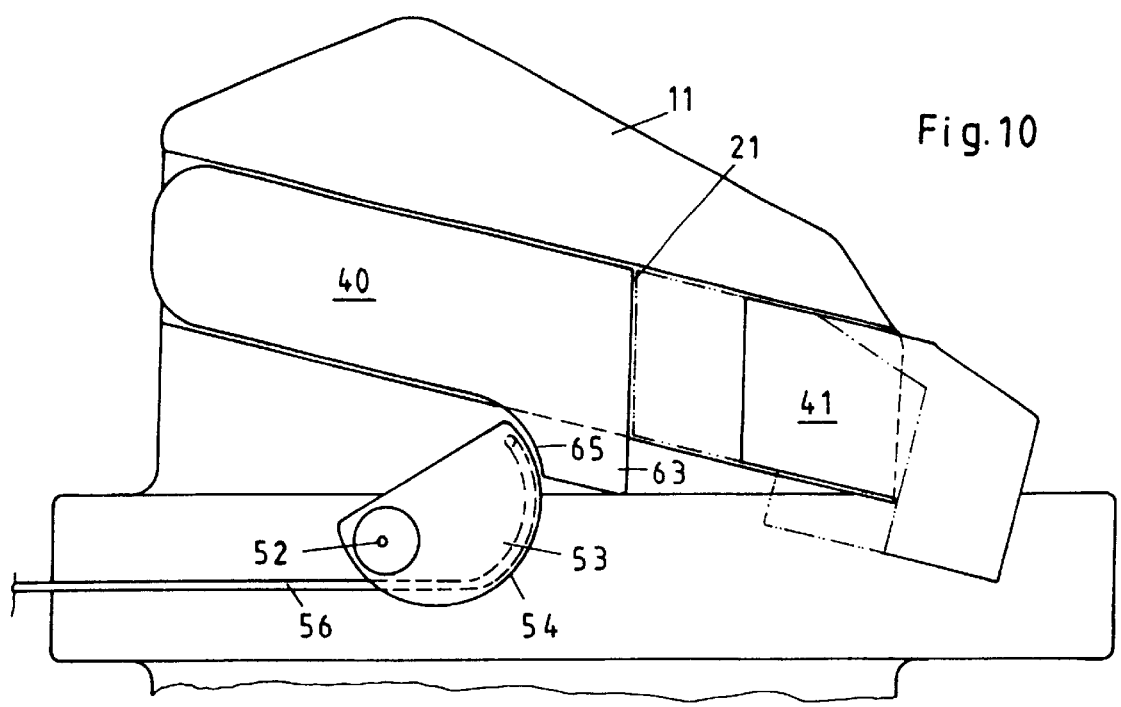
FIG. 10: a pattern sketch of a stowage component with a bolt consisting of two parts in the unlocked position.
Figure 11:
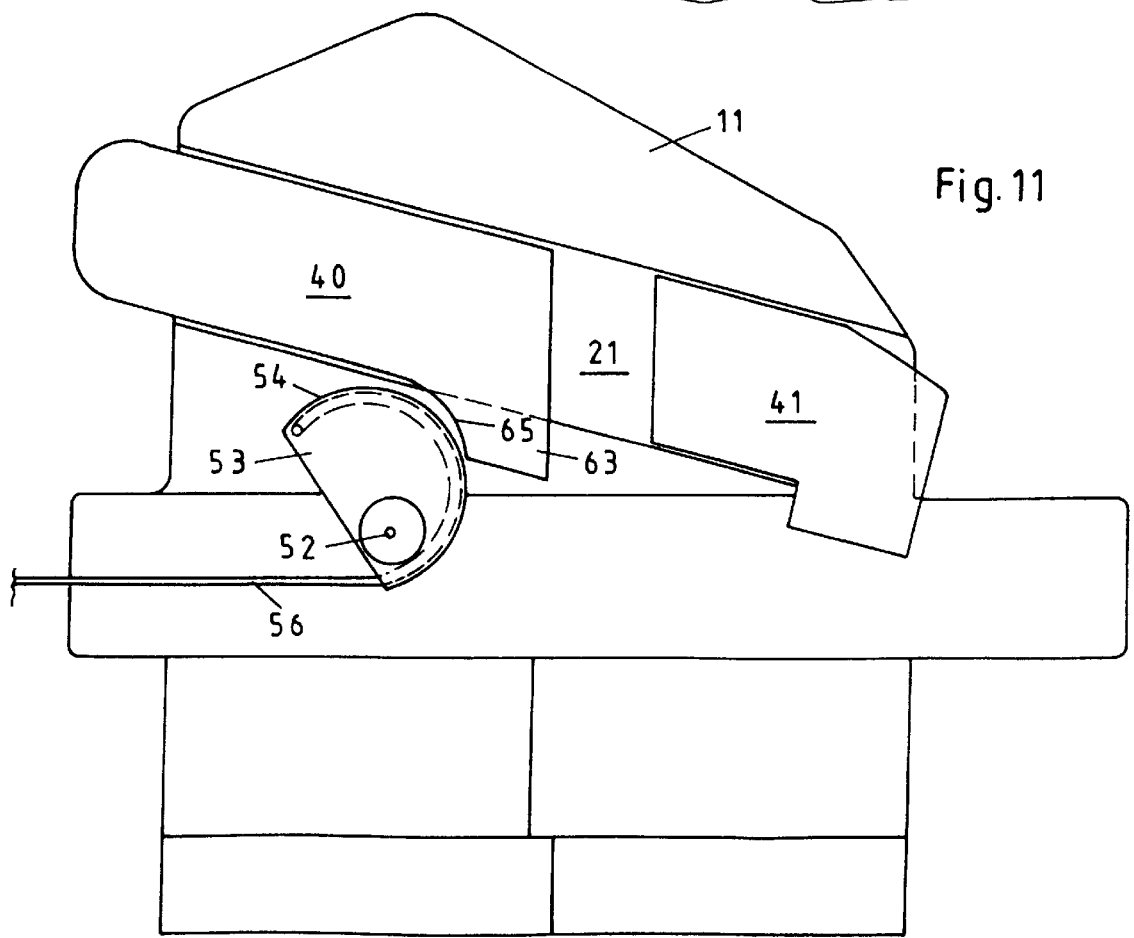
FIG. 11: a pattern sketch of a bolt consisting of two parts in the locked position.

In a number of cases, unlocking of the container 2,3,4 proves necessary before release of the side surface 27 by the control ends 29 takes place. This case can for example occur if the container 2,3,4 is raised not parallel to the support area 1 but obliquely thereto, so that in the area of a locked side, it is still securely connected to the support area 1, while on a manually unlocked side it is already being raised. This requirement is satisfied by an embodiment which is provided with a mechanism 50 for locking and unlocking (FIGS. 9 to 11). This substantially consists of an eccentric 51, which is formed as an arcuate piece 53 pivotal about an axis 52. This arcuate piece 53 is defined by an arc 54. The axis 52 passes through the arcuate piece 53 outwith a centre point of the arc.

The arcuate piece 53 is connected to a traction drive, in the embodiment shown a pivotal drive 55. This is in the form of a cable 56 extending over the arc 54, and which runs in a groove extending through the arc 54, and is connected to the arcuate piece 53 at an end 57 lying opposite the axis 52. The cable 56 is passed outwards through a bore 58 extending through the working surface 15, and carries at its end 59 projecting out of the bore 58 a handle 60, for example a knob which is easy to grasp. The bore 58 opens into a mouthpiece 61 which facilitates deflection of the cable 56, so that a position favourable for the respective user is enabled, when he draws the cable 56 out of the mouth piece 61 with the handle 60. In addition, there is also connected to the cable 56 a return spring 62, which after release of the cable 56 draws it back again into its initial position.

The arcuate piece 53 conforms closely with its arc 54 to a catch 63 correspondingly formed on the arc 54, on the part 40. This catch 63 has an arcuate surface 65 facing the arcuate piece 53, against which the arc 54 is pressed when the arcuate piece is pivoted. In an initial position 64, with the aid of the arcuate piece 53 no pressure is exerted in the arcuate surface 65, so that the forward part 40 is merely under the pressure of the compression springs 31 or 43. If the control end 29 formed on the rear part 41 is under the influence of the side surface 27, and if the bolt 24 is thereby displaced into its locking position, it is then uninfluenced by the arcuate piece 53.

If it now ensues that the forward piece 40 must be retracted from the locking position in the direction of the guide means 21, without load being removed from the control end 29 by raising the side surface 27, then traction is exerted on the cable 56 with the aid of the handle 60, so that the eccentric 51 pivots about the axis 52. Thus the arc 54 comes into contact with the arcuate surface 65 of the catch 63 and presses it, and thus also the part 42, upon further traction on the handle 60, in the direction of the rear part 41. Thus the tension in the two springs 31,43 increases. Despite this, the forward part 40 can be retracted until the side surface 27 of the container corner 6 can be withdrawn from the guide piece 11. This pivoted position of the arcuate piece 53 is shown in FIG. 10. In contrast to this FIG. 11 shows the part 40 in its locked position, in which the arc 54 of the arcuate piece 53 does not act upon the arcuate surface 65 of the catch 63.

The length of the cable 56 and the dimensions of the knob-like handle 60 are specially selected. Accordingly, the handle 60 is of such a size that it can enter entirely or partly into an upright aperture in one end face of the corresponding container 6, particularly into a corner casting. The length of the cable 56 projecting laterally out of the stowage component 10 is selected accordingly. Thus, in the case of narrow joints between adjacent containers, the handle 60 of the respective stowage component 10 can pass laterally through the corresponding aperture into the relevant container corner 6. Then the handle 60 on cable 56 does not present an obstruction during stowage of the containers. In particular, the containers can be stowed with an intermediate space which is smaller than the dimensions of the handle 60.

Figure 12:
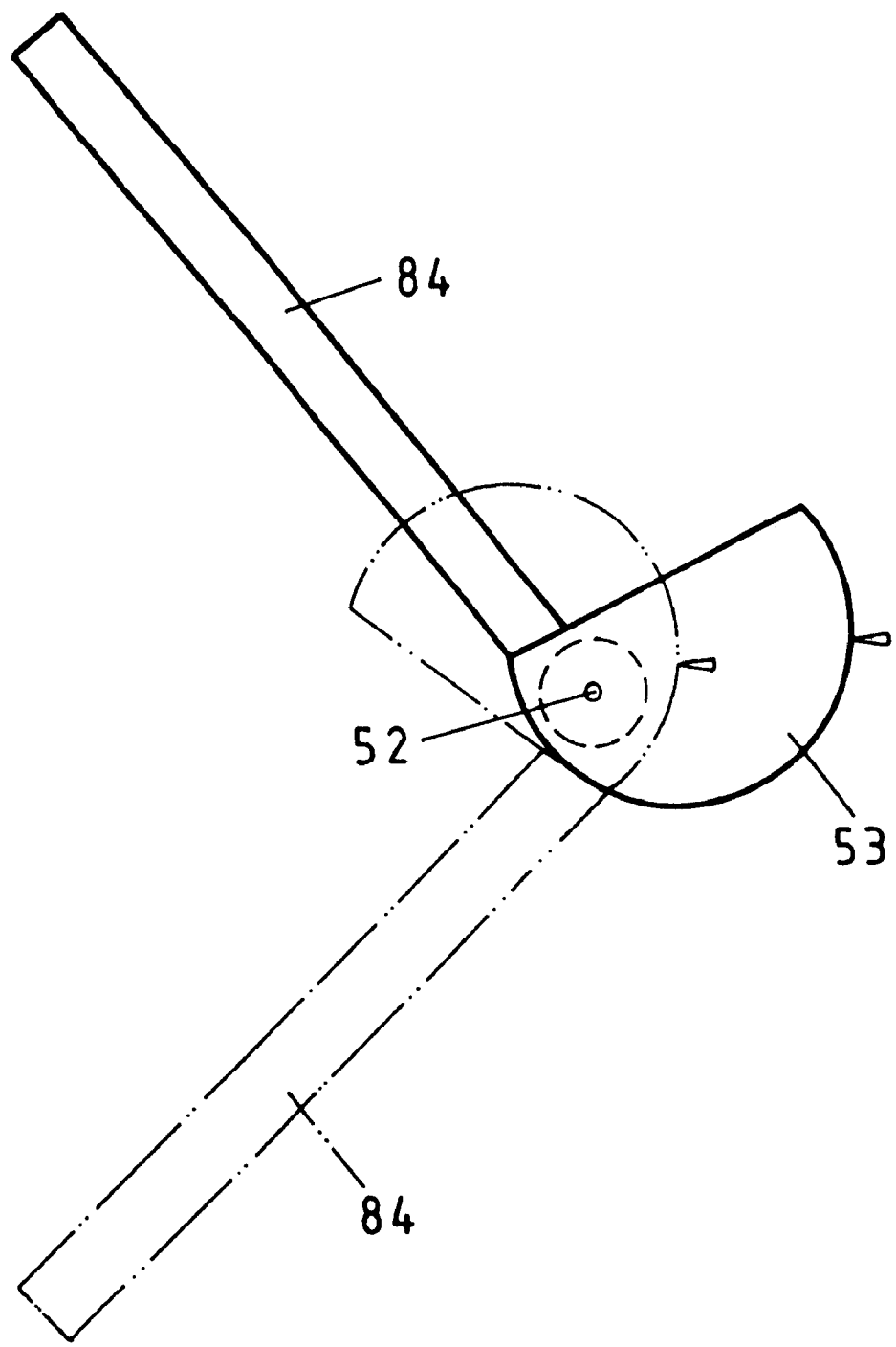
FIG. 12: a locking mechanism provided with a lever.
Figure 13:
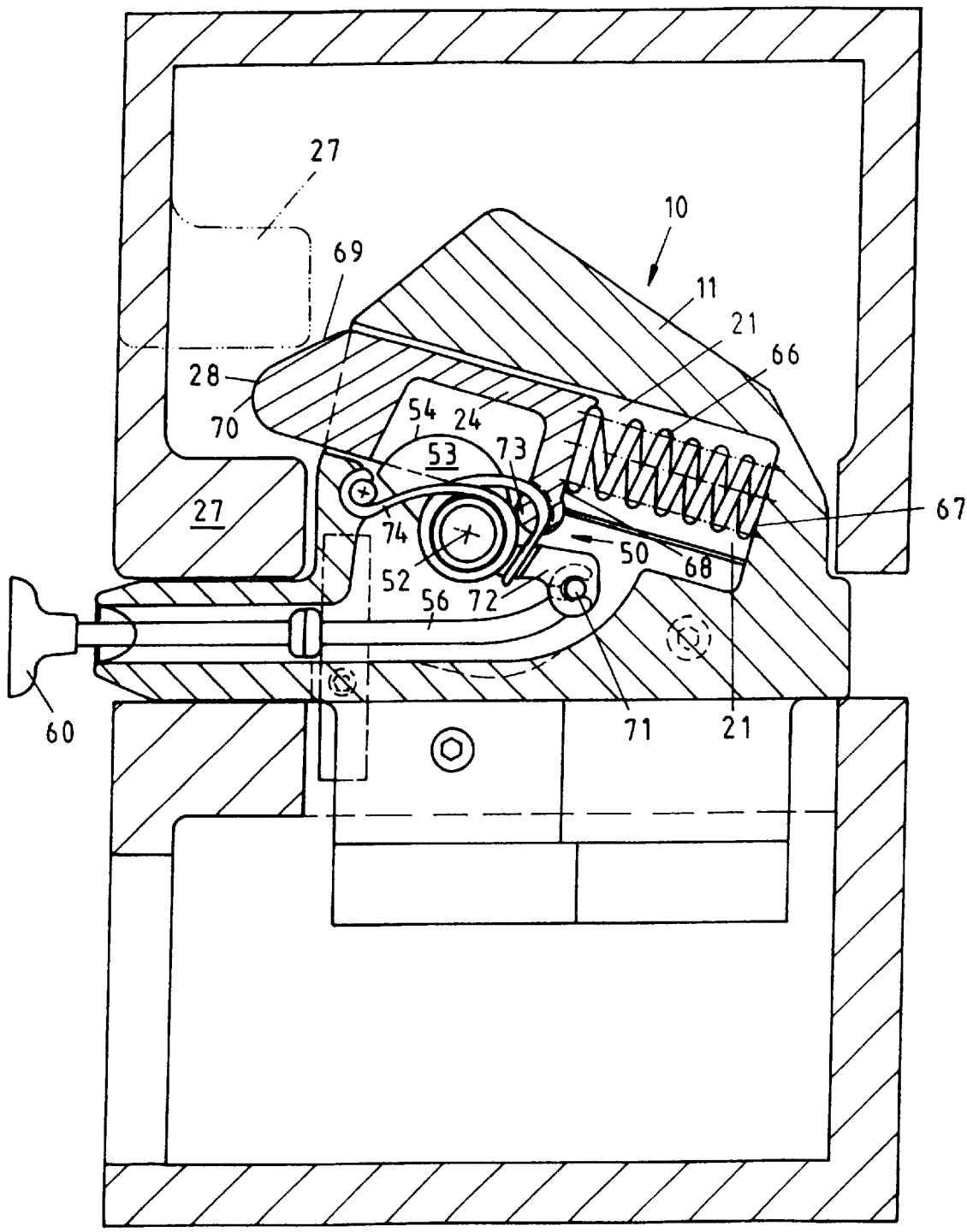
FIG. 13: a longitudinal section through a stowage component with a bolt projecting at one side into the locked position.

Instead of the pivotal drive 55, in which the force for pivoting the arcuate piece 53 is applied via a cable 56, it is possible to pivot the arcuate piece 53 about its axis 52 with the aid of a lever 84. The lever 84 is securely connected to the arcuate piece 53 (FIG. 12).

A further implication in operation results in the case of a stowage component 10 provided with a mechanism 50 for locking and unlocking in that the bolt 24 is no longer displaced, as in the embodiments already described, via a control end 29 into the respectively required position, but has only a locking end 28, by means of which the bolt 24 is continuously urged into the locked position by a compression spring 66 supported in the guide means 21. In this case the compression spring 66 is supported at one end at a rear wall 68 defining the bolt 24 and at the other end on an end 67 defining the guide means 21 (FIGS. 13 to 17).

During locking of the container 2,3,4, its side surface 27 is lowered in the direction of the locking end 28 of the bolt 24. In this case the locking end 28 has a slide surface 69 guiding the side surface 27, and which yields under the pressure of the descending side surface 27 in the direction of the guide means 21 and thus tensions the compression spring 66. As soon as the bolt 24 has yielded so far that the side surface 27 has moved past the outermost point of the locking end 28 into the locking position, the bolt 24 is then pushed back by the compression spring 66 into the locked position. Now the container corner 6 is automatically locked by the bolt 24.

If this locked condition is to be removed, the mechanism 50 for locking and unlocking is actuated. In this case a force is introduced into the cable 56 by means of a handle 60. The cable is pivotally articulated via a pivotal joint 71 on a pivot lever 72. The pivot lever 72 is securely connected to the arcuate piece 53, and mounted to pivot in common therewith about the axis 52. When the arcuate piece 53 is pivoted, the arc 54 is pressed against a pressure surface 73 formed on the bolt 24, so the bolt 24, as the pivoting of the arcuate piece 53 increases, slides in a guide means 21 backwards out of the locking position and thus biases the compression spring 66. At the same time a helical spring 74 surrounding the mechanism 50 is tensioned, which ensures, after load is removed from the cable 56, that the arcuate piece 53 is pivoted back into its initial position in which the bolt 24 is not acted upon.

Figure 14:
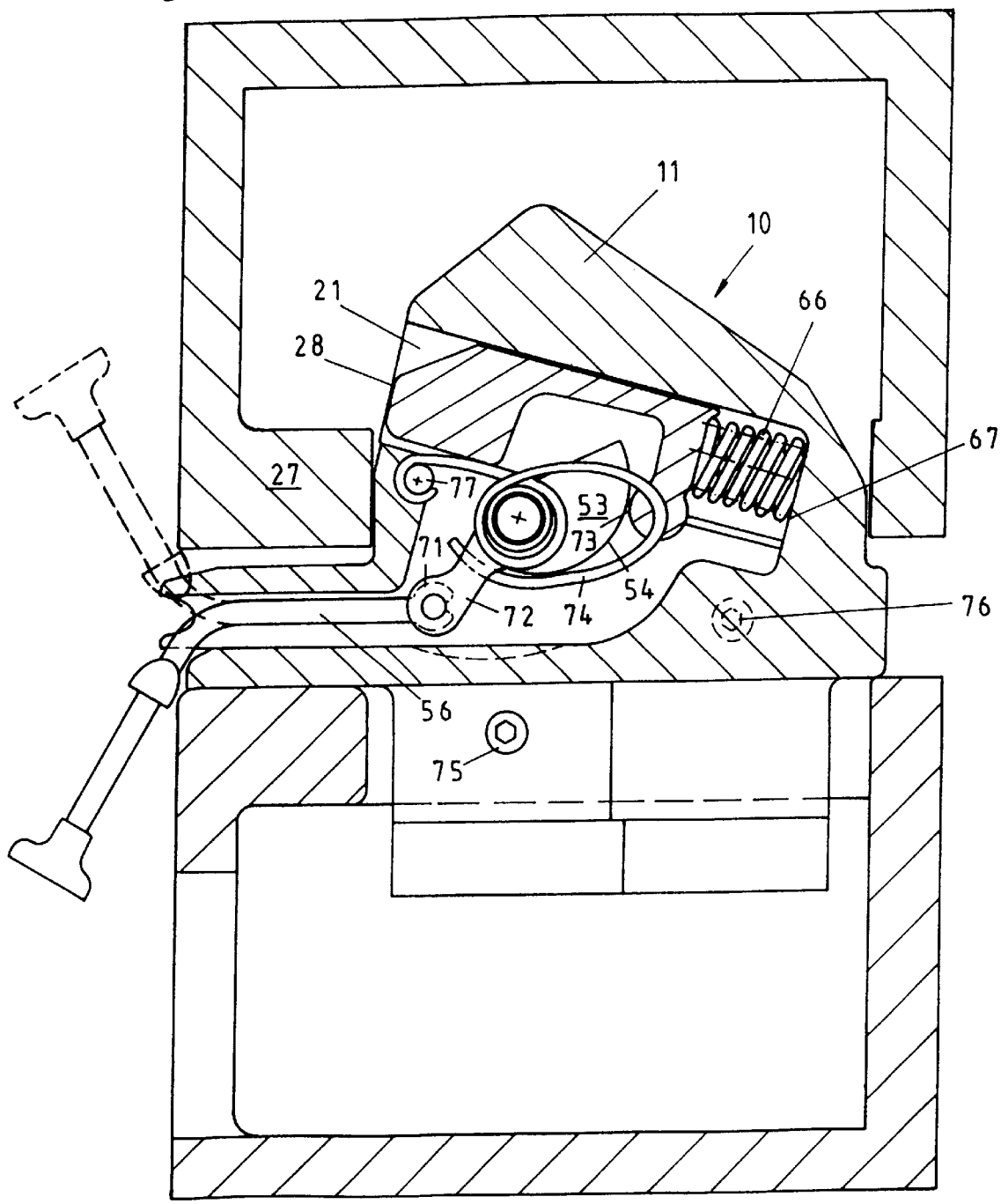
FIG. 14: a longitudinal section through a stowage component with a bolt drawn into the unlocked position by an unlocking mechanism.

After the bolt 24 has been withdrawn from a locked position, the side surface 27 can slide away over the outermost point 70 and can be raised from the guide piece 11. This unlocked position is shown in FIG. 14.

In order to assemble each stowage component 10, it is divided in the longitudinal direction. Thus there result two halves, which may be made of cast steel, which are held together by connecting screws 75,76,77. In this case the connecting screw 77 is additionally designed as a securing means for the helical spring 74.

Figure 15:
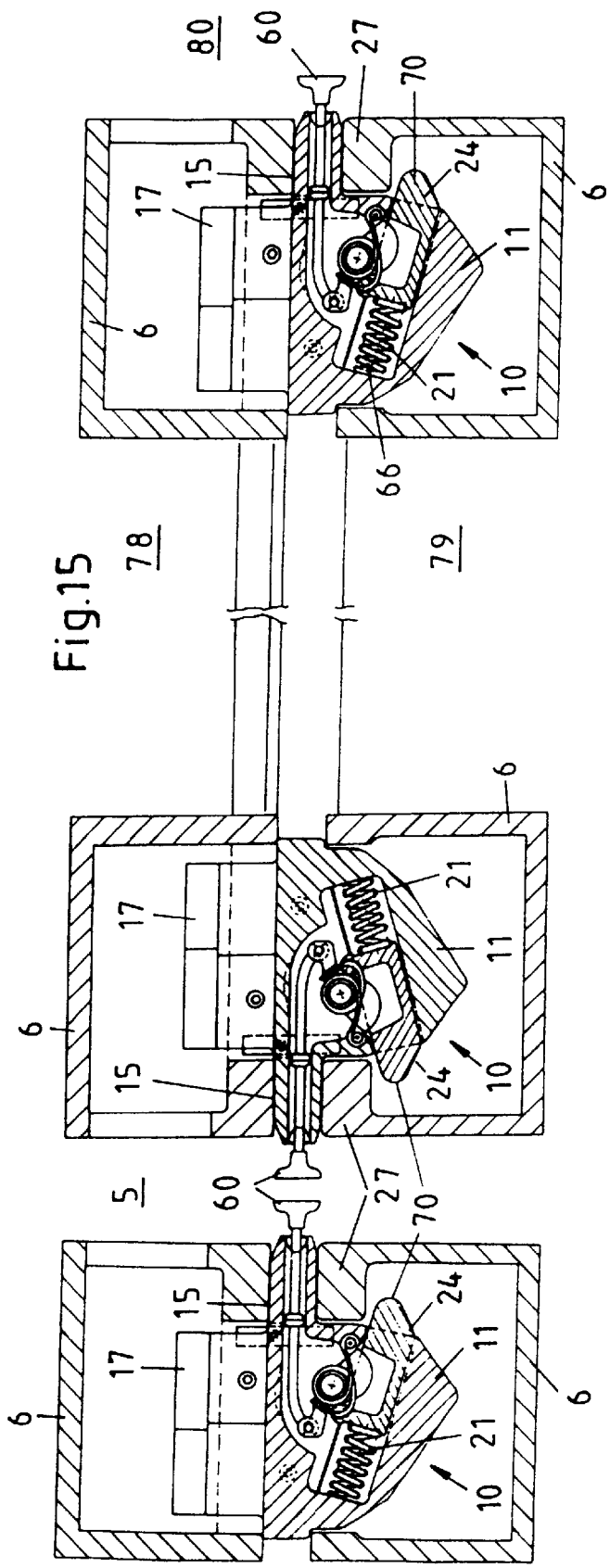
FIG. 15: a pattern sketch of corner castings shown in longitudinal section in the locked position (type of stowage: suspended)

The great advantage of this embodiment of the stowage component 10 resides in the fact that it can be used universally and without any alteration as a manually-operated operated stowage component 10 and also for example in the area of the 20-foot ISO container joint 5 in automatic operation. These cases are shown in FIGS. 15 to 17. FIG. 15 shows that the stowage component 10, in the suspended type of stowage, is suspended with its locking piece 17 in a container corner 6 of an upper container otherwise not shown. This upper container 78 is lowered in the direction of a lower container 79, so that the stowage component 10 slides with its guide piece 11 into the container corner 6 of the lower container 79. Thus the bolt 24 is acted upon by the side surface 27 of the container corner 6 provided on the lower container 79 in the direction of the guide means 21. The side surface 27 slides away over the outermost point 70 of the bolt 24 as soon as the upper container 78 stands on the working surface 15 of the stowage components 10. Thus locking is automatic both in the area of the 20-foot ISO container joint 5 and also in the opposite area 80.

If now the upper container 78 is to be raised again, firstly in the manually accessible area of the container two stowage components 10 lying on an end surface of the containers are unlocked. This is effected by actuation of the handle 60, so that the arcuate piece 53 is pivoted, so that the arc 54 is supported on the pressure 73. Thus the bolt 24 is retracted into the guide means 21 contrary to the action of the compression spring 66. Now the upper container 78 can be raised in the area of the two manually unlocked stowage components 10 in the area of the oppositely-lying end surface of the container 78 are still coupled to the container 79 underneath. Thus upon raising the upper container 78, the latter merely tilts. The consequence of this is that the vertical rear side of the guide piece 11, which is aligned away from the locking end 28 of the bolt 24, disengages from the side surface 27 of the aperture in the corner casting of the corner container 78 can be moved in the longitudinal direction relative to the lower container 79 (with respect to FIG. 15, to the right). Due to this there is a relative movement of a guide piece 11 in the container corner 6, lying in the area of a 20-foot ISO joint 5, of the lower container 79. This relative movement leads to a situation in which the locking end 28 of the bolt 24, projecting out of the guide means 21 of the guide means 11, slides out of the container corner 6 of the lower container 79. In this case the bolt 24 slides with its forward edge 39 along the side surface 27 of the aperture in the container corner 6 of the lower container 79. If necessary (alternatively), by designing the forward edge 39 of the bolts 24 as a sliding surface 81, the bolt 24 can be acted on in the direction of the guide means 21 from a specific relative movement of the bolt 24 or of the guide piece 11 in the container corner 6, so that in this way the compression spring 66 is tensioned and the bolt 24 is pressed entirely or partly into the guide means 21. The side surface 27 can then slide away over the outermost point of the sliding surface 81 and in this way the stowage component 10 can pass out of the opening 8 in the container corner 6.

A locking and unlocking of an upper container 82 relative to a lower container 83 is effected in a similar way if the stowage components 10 are thrust with their locking pieces 17 into the container corners 6 of the lower container 83. In this case the upper container 82 is lowered onto the guide piece 11, which arises from the container corner 6 of the lower container 83 (FIGS. 16 and 17). The side surface 27 of the container corner 6 attached to the upper container 82 presses the bolt 24 into its guide means 21. As soon as the side surface 27 has moved past the outermost point 70, the biased compression spring 66 presses the bolt 24 back into its locked position, so that the upper container is locked both in the area of the 20-foot ISO container joint 5 and also in the opposite area 80.

When the upper container 80 is raised, firstly the two stowage components 10 lying on an end side, are unlocked by pulling the handle 60 of the respective stowage component 10. Thus the bolt 24 is retracted into the guide means 21 of the respective stowage components 10. The side surface 27 of the respective stowage component 10 can slide away over the outermost point of the corresponding container corner 6. Thus the upper container 82 adopts an oblique position, as it is still securely held in the area of the container corners 6 located at the opposite end side, which due to the narrowness of the 20-foot ISO container joint 5 cannot be manually unlocked via the handles 60. Due to this oblique positioning, however the rear sides of the guide pieces 11 are released from the adjacent side surfaces 27 of the corresponding container corners 6 of the upper container 82. Thus the forward edges 39 of the bolt 24 of the stowage components 10, projecting out of the guide means 21, are pivoted in the area of the narrow 20-foot ISO container joint 5 out of the corner casting of the respective container corner 6 of the upper container 82 (FIG. 18). Now the entire upper container 82 can be raised from the lower container 83.

An essential feature for the unlocking procedures described with reference to FIGS. 15 to 17 is that the bolts 24 are oblique or inclined to the plane extending through the under side or upper side of the respective container. This inclination simplifies removal of the guide pieces 11, with the bolt 24 located in the locked position, from the corresponding container corner 6. Furthermore, this removal can be facilitated in that the forward surface of the guide piece 11, penetrated by the guide means 21, is slightly inclined relative to the working surface 15, so that the displacement of the ascending side surface 27 of the corresponding container in the direction of the forward edge 39 of the bolt 24 is facilitated.

By means of the functions described with reference to FIGS. 15 to 17, the use of a unified stowage component 10 is enabled both in the area of the 20-foot ISO container joint 5 and also in the area 80 accessible for manual actuation of the stowage container 10. The previously necessary differentiation between container components which can be used only in the narrow 20-foot ISO container joint 5, and those which are used for an area accessible for manual handling, can be avoided due to the uniform stowage component according to the invention which is usable for every case, i.e. a semi-automatic stowage component.

What is claimed is:

1. Stowage component for locking an upper container to at least one lower container, upon which the upper container is supported, the lower container comprising a support area and the upper container comprising a lower surface which is supported on the support area, and the lower surface comprising at least one aperture, characterized in that the stowage component comprises a guide piece (11), a guide means (21) extending in the guide piece, a bolt (24) displaceably mounted within the guide means, and a traction drive (60), wherein the guide piece (11) is lockable into a locking position in the at least one aperture by means of the bolt (24), and the locking position of the guide piece in the at least one aperture is releasable by means of the traction drive.

2. Stowage component according to claim 1, characterized in that the bolt (24) has a control end (29) facing away from a locking end (28), and which is acted upon in the locking position of the bolt (24) by a force acting thereon.

3. Stowage component according to claim 2, characterized in that the control end (29) is acted upon in the locking position by the container lowered onto the support area (1).

4. Stowage component according to claim 3, wherein the bolt (24) extends obliquely to a plane spanned by the support area (1) in such a way that the spacing between the bolt (24) and the support area (1) increases towards the locking end (28).

5. Stowage component according to claim 4, characterized in that the bolt (24) is displaceably mounted obliquely within the guide means (21), the bolt (24) opens with the control end (29) in the plane of the support area (1), and the locking end (28) lies above the plane of the support area (1) at a spacing therefrom, which corresponds to the locking position (25) provided in the at least one aperture.

6. Stowage component according claim 1, characterized in that the bolt (24) consists of at least two parts (40, 41) located one behind the other in a longitudinal direction.

7. Stowage component according to claim 1, characterised in that there is associated with the bolt (24) a mechanism (50) for locking and unlocking.

8. Stowage component according to claim 7, characterized in that mechanism (50) for locking and unlocking is in the form of an eccentric (51) supported on the bolt (24).

9. Stowage component according to claim 5, characterized in that the guide piece (11) is surrounded at a vertical spacing predetermined by the locking position (25) from the locking end (28) of the bolt (24) by a working surface area (1) on the lower container, the working surface area (1) comprising a first under-surface (16) that is located on the working surface area (1), and by a second under-surface (13) on the upper container that is supportable on and facing an upper side of the upper defining surface of the lower container and extending roughly parallel to and in the same plane as the first under-surface (16).

10. Stowage component according to claim 8, characterised in that the eccentric (51) is mounted on an axis (52) and is connected to the traction drive in order to be pivoted.

11. Stowage component according to claim 10, characterized in that the traction drive has a cable (56) and a handle (60) located at a free end and thereof, the cable (56) being articulated to a pivot lever (72) connected to the eccentric (51).

12. Stowage component according to claim 8, characterised in that the eccentric (51) is in the form of an arcuate piece (53) pivotal about an axis (52) and defined by an arc (54), and which is penetrated by the axis (52) outwith a centre point of the arc (54), and is supported with the arc (54) on an arcuate surface (65) formed on the bolt (24).

13. Stowage component according to claim 12, characterised in that the arcuate surface (65) has a curvature corresponding to the arc (54).

14. Stowage component according to claim 12, characterised in that arcuate piece (53) is connectable to a lever drive.

15. Stowage component according to claim 4, characterised in that the bolt (24) is displaceable by a descending container (2, 3, 4) in the guide means (21) contrary to the force of a spring (31).

16. Stowage component according to claim 15, characterized in that the bolt (24) has, on the locking end (28) projecting in the locking position out of the guide means (21), a slide surface (69) acted upon by the descending container (2, 3, 4) to displace the bolt (24) along the guide means (21).

17. Stowage component according to claim 16, characterized in that the bolt 24 has on the locking end (28) a pressure surface acted upon by the container (2, 3, 4) that acts upon the bolt (24) contrary to a spring force.

18. Stowage component according to claim 11, characterized in that the cable (56) and the handle (60) are of such dimensions or design that at least the handle (60) can enter at least partly into an aperture in the container.

19. Stowage component according to claim 16, characterized in that the slide surface has a downward incline aligned in a direction facing away from a joint (5) between the containers.

20. Stowage component according to claim 19, characterized in that two guide pieces (11) are used on a side of a container (2, 3, 4) facing the joint (5), wherein one of the two guide pieces (11) has a sliding surface with a downward incline extending toward the joint (5), and the other of the two guide pieces (11) has a downward inclination extending away from the joint (5).

21. Stowage component for locking an upper container to at least one lower container, upon which the upper container is supported, the lower container comprising a support area and the upper container comprising a lower surface which is supported on the support area, and the lower surface comprising at least one aperture, characterized in that the stowage component comprises:

a. at least a first guide piece and a second guide piece;
   b. a first guide means extending in the first guide piece and a second guide means extending in the second guide piece;
   c. a first bolt displaceably mounted within the first guide means and a second bolt displaceably mounted within the second guide means; and
   d. a traction drive, wherein the first guide piece is lockable into a locking position in at least one aperture by means of the first bolt, the second guide piece is lockable into a locking position in at least one aperture by means of the second bolt, the locking position of the first guide piece is releasable by means of the traction drive, and the locking position of the second guide piece is releasable by a relative movement of the upper container with respect to the second guide piece. corner 6 of the lower container 79. If necessary (alternatively), by designing the forward edge 39 of the bolts 24 as a sliding surface 81, the bolt 24 can be acted on in the direction of the guide means 21 form a specific relative movement of the bolt 24 or of the guide piece 11 in the container corner 6, so that in this way the compression spring 66 is tensioned and the bolt 24 is pressed entirely or partly into the guide means 21. The side surface can then slide away over the outermost point of the sliding surface 81 and in this way the stowage component 10 can pass out of the opening 8 in the container corner 6.

* * * * *